(12) United States Patent
Cox

(10) Patent No.: US 11,293,329 B2
(45) Date of Patent: Apr. 5, 2022

(54) INTEGRATED BELLOWS GASKET

(71) Applicant: CUMMINS INC., Columbus, IN (US)

(72) Inventor: Stephen Russell Cox, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/030,006

(22) Filed: Sep. 23, 2020

(65) Prior Publication Data

US 2021/0108550 A1 Apr. 15, 2021

Related U.S. Application Data

(60) Provisional application No. 62/915,067, filed on Oct. 15, 2019.

(51) Int. Cl.
| | | |
|---|---|---|
| *F01N 13/18* | (2010.01) | |
| *F01N 13/00* | (2010.01) | |
| *F01N 13/08* | (2010.01) | |
| *F02F 11/00* | (2006.01) | |
| *F16L 23/18* | (2006.01) | |

(52) U.S. Cl.
CPC ............ *F01N 13/085* (2013.01); *F02F 11/00* (2013.01); *F16L 23/18* (2013.01)

(58) Field of Classification Search
CPC ............. F01N 13/1816; F01N 13/1811; F01N 13/1805; F01N 13/1827; F01N 2470/12
See application file for complete search history.

(56) References Cited

U.S. PATENT DOCUMENTS

| | | | | |
|---|---|---|---|---|
| 5,944,363 A * | 8/1999 | Cwik | .................... | F16L 27/053 285/226 |
| 5,957,504 A * | 9/1999 | Cwik | .................. | F01N 13/1811 285/49 |
| 5,984,372 A * | 11/1999 | Cwik | ...................... | F16L 27/11 285/49 |
| 6,086,110 A * | 7/2000 | Lee | ......................... | B21C 37/20 285/226 |
| 6,464,257 B1 * | 10/2002 | Cwik | ...................... | F16L 27/10 285/49 |
| 6,902,202 B2 * | 6/2005 | Huber | ................. | F01N 13/1805 285/226 |
| 9,581,248 B2 | 2/2017 | Itadani et al. | | |
| 2002/0171240 A1 * | 11/2002 | Cwik | .................. | F01N 13/1827 285/301 |

(Continued)

FOREIGN PATENT DOCUMENTS

WO WO-2015/165576 11/2015

*Primary Examiner* — Long T Tran
(74) *Attorney, Agent, or Firm* — Foley & Lardner LLP

(57) ABSTRACT

A system for sealing components of an exhaust system in an engine system comprises a bellows with an elongated portion. A flange is coupled to the elongated portion, the flange comprising a first portion and a second portion. An extended portion extends between the first portion and the second portion, the extended portion defining a gap and having a cross-sectional shape different than the first portion and the second portion. A connector is configured to couple an aftertreatment system to the flange. The connector comprises a sealing surface adjacent to the flange. A sealing component is sized and configured to fit partially within the gap and contact the sealing surface to create a seal between the extended portion and the sealing surface.

21 Claims, 2 Drawing Sheets

(56) References Cited

U.S. PATENT DOCUMENTS

| | | | |
|---|---|---|---|
| 2003/0102666 A1* | 6/2003 | Huber | F01N 13/1816 |
| | | | 285/288.1 |
| 2005/0133012 A1 | 6/2005 | Grussmann et al. | |
| 2016/0238174 A1 | 8/2016 | Farr et al. | |
| 2017/0198663 A1* | 7/2017 | Lindberg | F16L 51/025 |
| 2018/0252141 A1* | 9/2018 | Cox | F01N 13/14 |

* cited by examiner

INTEGRATED BELLOWS GASKET

CROSS-REFERENCE TO RELATED APPLICATIONS

The present application claims priority to U.S. Provisional Application No. 62/915,067, filed Oct. 15, 2019, the entire content of which are incorporated herein by reference.

TECHNICAL FIELD

The present disclosure relates generally to systems for sealing surfaces in an exhaust system in an engine system.

BACKGROUND

An exhaust system of an internal combustion engine provides a conduit through which exhaust gases from the engine are guided away from the engine after a combustion cycle. The exhaust gases may flow through one or more of a cylinder head, an exhaust manifold, a turbocharger, a particulate filter, a selective catalytic reduction (SCR) catalyst, an oxidation catalyst, and other components as they are directed away from the engine. Accordingly, the exhaust system can include a variety of components including pipes, connectors (e.g., bellows connectors), and sealing mechanisms (e.g., gaskets). During engine operation, the components of the exhaust system are exposed to the high temperatures of the exhaust gases, causing the components to expand. When the engine is not operating and no exhaust gases are flowing, the temperature of the components of the exhaust system is reduced, and the components contract. The sealing mechanisms prevent exhaust gas from escaping the exhaust system during the expansion and contraction of the respective components.

SUMMARY

In one set of embodiments, a system for sealing components of an exhaust system in an engine system comprises a bellows with an elongated portion. A flange is coupled to the elongated portion, the flange comprising a first portion and a second portion. An extended portion extends between the first portion and the second portion, the extended portion defining a gap and having a cross-sectional shape different than the first portion and the second portion. A connector is configured to couple an aftertreatment component to the flange, the connector comprising a sealing surface adjacent to the flange. A sealing component is sized and configured to fit partially within the gap and contact the sealing surface to create a seal between the extended portion and the sealing surface.

In another set of embodiments, an aftertreatment system includes an aftertreatment component. A bellows comprises an elongated portion, a flange extending from the elongated portion at a non-zero angle, the flange comprising a first portion and a second portion, and an extended portion extending between the first portion and the second portion, the extended portion having a sealing component. A connector couples the aftertreatment component to the flange, the connector comprising a sealing surface adjacent to the flange of the bellows. The sealing component contacts the sealing surface so as to create a seal between the bellows and the aftertreatment component.

In yet another set of embodiments, a bellows configured to couple to an aftertreatment system of an engine system comprises an elongated portion, a flange, an extended portion, and a sealing component. The flange extends from the elongated portion at a non-zero angle and includes a first portion and a second portion. The extended portion extends between the first portion and the second portion and defines a gap, the first portion having a first cross-sectional shape, the second portion having a second cross-sectional shape, and the extended portion having a third cross-sectional shape, where the third cross-sectional shape is different than both the first cross-sectional shape and the second cross-sectional shape. The sealing component is disposed in the gap. The flange is configured to couple with an aftertreatment component of the aftertreatment system via a connector comprising a sealing surface adjacent to the flange, and the sealing component is configured to contact the sealing surface so as to create a seal between the bellows and the aftertreatment component.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for sealing surfaces of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Implementations herein relate to systems for sealing surfaces in an exhaust system associated with internal combustion engine systems. In some embodiments, pipes in an exhaust system are coupled by a bellows secured to the pipes with a connector. The bellows includes a flange with an extended portion, where the extended portion includes a sealing component. The sealing component engages with a sealing surface of the connector to create a seal and prevent exhaust gases from escaping the exhaust system. The sealing component is configured to maintain the seal with the sealing surface as the temperature within the exhaust system fluctuates. Providing the flange with a sealing component obviates the need to provide a separate gasket between the flange and the sealing surface to prevent exhaust gases from escaping the exhaust system.

II. Example Bellows Connection

Figure 1:
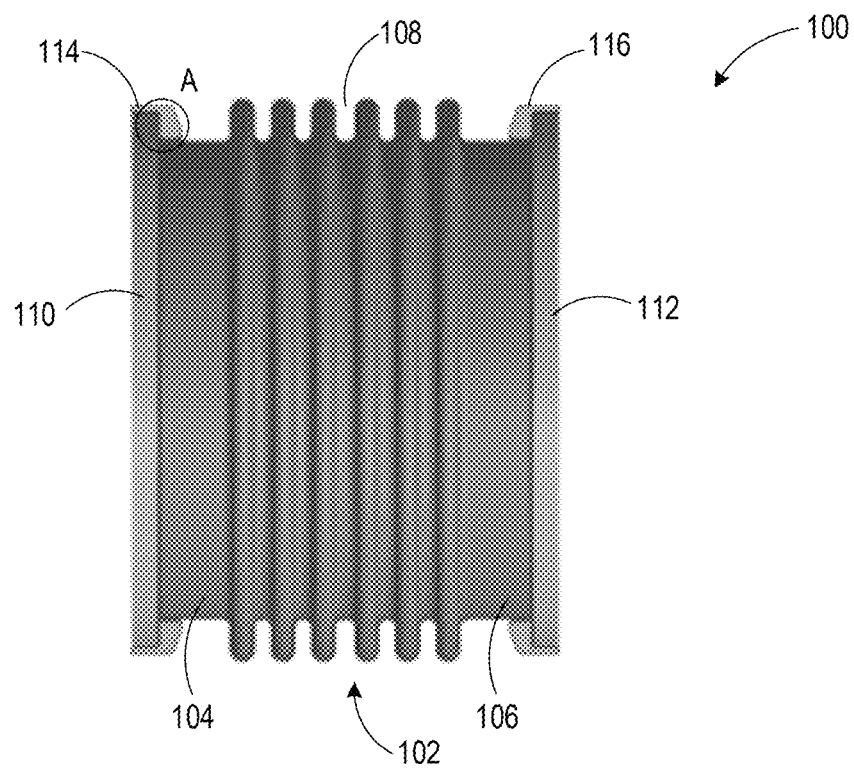
FIG. 1 is an illustration of an exhaust system connection, according to a particular embodiment.

FIG. 1 is an illustration of an exhaust system connection 100, according to a particular embodiment. The exhaust system connection 100 includes a bellows 102, a first pipe 110 (an end of which is shown in FIG. 1), a second pipe 112

(an end of which is shown in FIG. 1), a first connector 114, and a second connector 116. The second connector 116 is substantially similar to the first connector 114 in structure, function, and its mechanism for coupling the second pipe 112 and the bellows 102. Accordingly, embodiments described herein related to the first connector 114 also apply to the second connector 116. The bellows 102 includes a first elongated portion 104, a second elongated portion 106, a ribbed portion 108 positioned between the first elongated portion 104 and the second elongated portion 106, and one or more flanges (not shown). The flanges are further described with reference to FIG. 2. The ribbed portion 108 includes a plurality of ribs that allow the bellows 102 to expand and contract in response to temperature changes. For example, at high temperatures (e.g., 300-1200 degrees Fahrenheit) the ribbed portion 108 contracts in response to thermal expansion of the first pipe 110 and the second pipe 112 such that the bellows 102 decreases in length. At low temperatures (e.g., ambient temperature) the ribbed portion 108 expands in response to thermal contraction of the first pipe 110 and the second pipe 112 such that the bellows 102 increases in length. Accordingly, the bellows 102 can be manufactured from any material that provides the desired expansion and/or contraction based on the temperature. Such materials include, but are not limited to, metal (e.g., steel, aluminum, or other suitable metals), rubber (e.g., neoprene, butyl rubber, nitrile rubber, or other suitable rubbers), plastic (e.g., polytetrafluoroethylene, polyvinyl chloride, or other suitable plastics), or any other material suitable for the application. The first elongated portion 104 extends between the ribbed portion 108 and a flange 204 (not shown). The second elongated portion 106 extends between the ribbed portion 108 and a second flange (not shown).

The first pipe 110 is coupled to the bellows 102 via the first connector 114 and is configured to direct exhaust gas through the engine exhaust system. The first pipe 110 can be any type of pipe suitable for use in an engine exhaust system (e.g., steel, aluminum, or any other suitable material). The second pipe 112 is coupled to the bellows 102 via the second connector 116 and is configured to direct exhaust gas through the engine exhaust system. As one of ordinary skill would understand, the connection between the first pipe 110 and the bellows 102 (via the first connector 114) is substantially similar to the connection between the second pipe 112 and the bellows 102 (via the second connector 116). Accordingly, the description of the connection between the first pipe 110 and the bellows 102 applies to the connection between the second pipe 112 and the bellows 102 as well.

The first connector 114 may be any device or system configured to couple the bellows 102 to the first pipe 110. Examples of the first connector 114 include, but are not limited to, clamps (e.g., saddle clamps, wire ring clamps, band clamps, or any other suitable clamp), flanges (e.g., split flanges, or any other suitable flange), and any other type of connector suitable to couple the first pipe 110 to the bellows 102. The connection between the first pipe 110 and the bellows 102 will be further described with reference to FIG. 2. Though the components coupled to the bellows 102 are described as pipes (e.g., the first pipe 110 and the second pipe 112), the components coupled to the bellows could be any of a variety of aftertreatment components, such as oxidation catalysts, SCR catalysts, and other components.

Figure 2:
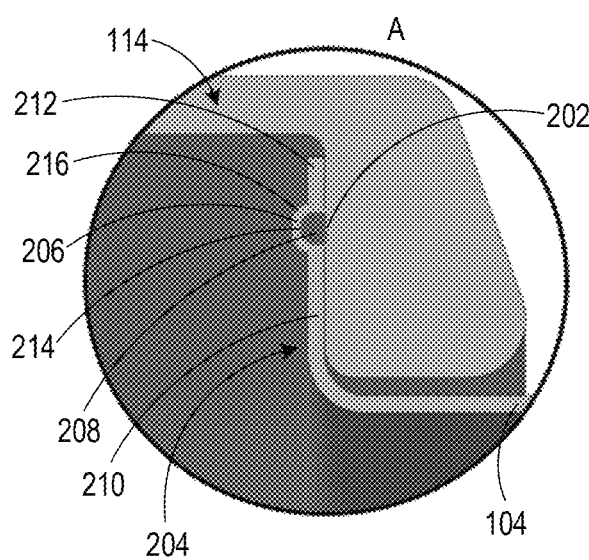
FIG. 2 is an illustration of a portion of the bellows connector of FIG. 1 coupled to the pipe of FIG. 1.

FIG. 2 is an illustration of a portion of the bellows 102 coupled to the first pipe 110, both of FIG. 1. The bellows 102 further includes the flange 204. The flange 204 extends from the first elongated portion 104 at an angle to the first elongated portion 104. In some embodiments, the angle between the first elongated portion 104 and the flange 204 is between eighty and one hundred degrees. The flange 204 includes a first portion 210, a second portion 212, an extended portion 206, and a sealing component 208. The first portion 210 and the second portion 212 are substantially straight (e.g., within plus or minus five degrees of perfect straightness) and have a substantially rectangular cross-sectional shape. The extended portion 206 is disposed between the first portion 210 and the second portion 212 such that the first portion 210 and the second portion 212 are joined by the extended portion 206. In some embodiments, the first portion 210, the second portion 212, and the extended portion 206 are of a unitary construction. For example, the first portion 210, the second portion 212, and the extended portion 206 can be formed from a single piece of material used to form the bellows 102. In arrangements where the bellows 102 is manufactured from rubber, plastic, or other material capable of being molded, the bellows 102 may be molded as a single component, with features such as the first portion 210, the second portion 212, and the extended portion 206 created when the bellows 102 is molded. In embodiments where the first portion 210, the second portion 212, and the extended portion 206 are not created at the time the bellows 102 is molded, the first portion 210, the second portion 212, and the extended portion 206 can be manufactured by manipulating a portion of the bellows 102 into the desired position and heat treating the portion according to known methods to impart the desired shapes.

The extended portion 206 defines a space or gap in which the sealing component 208 is disposed. The sealing component 208 is operable to contact a sealing surface 202 of the first connector 114 to create a seal between the sealing component 208 and the sealing surface 202. The sealing component 208 can be manufactured from any material suitable to deform upon contact with another surface such that a seal is created (e.g., rubber, silicone, plastic polymers, or other suitable materials). In some embodiments, the sealing component 208 is manufactured from the same material as the extended portion 206. In some implementations, the sealing component 208 and the extended portion 206 are of a unitary construction. For example, at the time the bellows 102 is manufactured, the flange 204 is created such that the sealing component 208 and the extended portion 206 are indistinguishable (e.g., the extended portion 206 and the sealing component 208 are a single portion of the flange 204). In some arrangements, the sealing component 208 and the extended portion 206 are not of a unitary construction. For example, the sealing component 208 may be manufactured from a different material than the extended portion 206. In such instances, the sealing component 208 is assembled to the extended portion 206 via any known assembly method (e.g., adhesive bonding, thermal bonding, or other known assembly methods). In another example embodiment, the sealing component 208 may be manufactured from the same material as the extended portion 206, but is provided as a component separate from the extended portion 206. In such embodiments, the sealing component 208 is assembled to the extended portion 206 via any known assembly method (e.g., adhesive bonding, thermal bonding, or other known assembly methods).

The cross-sectional shape of the extended portion 206 can be any shape that can have the desired effect of providing a space or gap to receive the sealing component 208. For example, the extended portion 206 can have a curved cross-sectional shape, where the extended portion 206 extends between the first portion 210 and the second portion 212 in a curvilinear manner. As another example, the extended portion 206 can have a rectangular cross-sectional shape. Furthermore, an inner surface 214 of the extended portion 206 (e.g., the section of the extended portion 206 closest to the sealing surface 202) may have a different cross-sectional shape than an outer surface 216 of the extended portion 206 (e.g., the section of the extended portion 206 furthest from the sealing surface 202). For example, the inner surface 214 may have a curved cross-sectional shape, and the outer surface 216 may have a rectangular cross-sectional shape.

The cross-sectional shape of the sealing component 208 can be any shape that can have the desired effect of creating a seal between the flange 204 and the sealing surface 202. In embodiments where the sealing component 208 and the extended portion 206 are of a unitary construction, the cross-sectional shape of the portion of the sealing component 208 in contact with the inner surface 214 substantially matches the cross sectional shape of the inner surface 214. The cross-sectional shape of the portion of the sealing component 208 intended to contact the sealing surface 202 can be any shape that can provide a suitable seal against the sealing surface 202. For example, the portion of the sealing component 208 intended to contact the sealing surface 202 can have a circular, elliptical, or rectangular cross-sectional shape, or any other cross-sectional shape that can provide the desired seal.

In embodiments where the sealing component 208 and the extended portion 206 are different components, the cross-sectional shape of the sealing component 208 can be any shape suitable to provide a seal between the extended portion 206 and the sealing surface 202. For example, the sealing component 208 can have a circular, elliptical, or rectangular cross-sectional shape, or any other cross-sectional shape that can provide the desired seal.

III. Example Seal Operation

Figure 3:
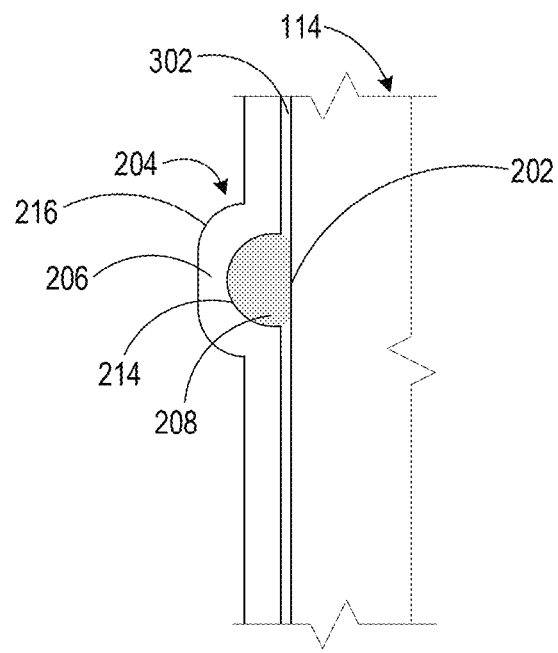
FIG. 3 is an illustration of the bellows connector of FIG. 1 creating a seal against the pipe of FIG. 1 at a first temperature, according to a particular embodiment.

FIG. 3 is an illustration of the bellows 102 creating a seal against the first connector 114, both of FIG. 1, at a first temperature, according to a particular embodiment.

In an example arrangement, an engine may be operating at a high temperature and create exhaust gases that are directed through an exhaust system. The temperature of the exhaust gases is high, thereby causing the bellows 102 to contract (e.g., in response to expansion of the first pipe 110) and move toward the first connector 114. This contraction creates a space 302 between the flange 204 and the sealing surface 202. The sealing component 208 creates a seal between the flange 204 and the sealing surface 202. The sealing component 208 is shown as having a circular cross-sectional shape, with a portion of the sealing component 208 being compressed against the sealing surface 202 to create the seal. The sealing component 208 can have any other cross-sectional shape that can suitably create a seal between the flange 204 and the sealing surface 202.

Figure 4:
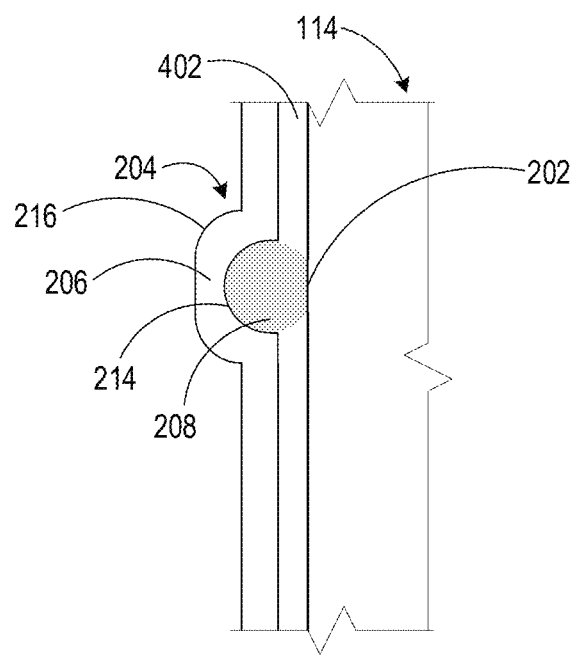
FIG. 4 is an illustration of the bellows connector of FIG. 1 creating a seal against the pipe of FIG. 1 at a second temperature.

FIG. 4 is an illustration of the bellows 102 creating a seal against the first connector 114, both of FIG. 1, at a second temperature.

In an example arrangement, an engine may be operating at a low temperature and create exhaust gases that are directed through an exhaust system. The temperature of the exhaust gases is low, thereby causing the bellows 102 to expand (e.g., in response to contraction of the first pipe 110) and move away from the first connector 114. This contraction creates a space 402 between the flange 204 and the sealing surface 202, where the space 402 is larger than the space 302 of FIG. 3. The sealing component 208 creates a seal between the flange 204 and the sealing surface 202. The sealing component 208 is shown as having a circular cross-sectional shape, with a portion of the sealing component 208 being compressed against the sealing surface 202 to create the seal. The sealing component 208 can have any other cross-sectional shape that can suitably create a seal between the flange 204 and the sealing surface 202.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present disclosure.

What is claimed is:

1. A system for sealing components of an exhaust system in an engine system, comprising:
   a bellows, comprising;
     an elongated portion;
     a flange coupled to the elongated portion, the flange comprising a first portion and a second portion; and
     an extended portion extending between the first portion and the second portion, the extended portion having an inner surface and an outer surface, the inner surface and the outer surface each having a cross-sectional shape different than the first portion and the second portion, the extended portion defining a gap;
   a connector configured to couple an aftertreatment component to the flange, the connector comprising a sealing surface adjacent to the flange; and
   a sealing component sized and configured to fit partially within the gap and contact the sealing surface so as to create a seal between the extended portion and the sealing surface.

2. The system of claim 1, wherein the sealing component and the extended portion are of a unitary construction.

3. The system of claim 2, wherein the sealing component, the extended portion, the first portion, and the second portion are of a unitary construction.

4. The system of claim 1, wherein the sealing component and the extended portion are constructed from the same material.

5. The system of claim 1, wherein the cross-sectional shape of the extended portion is a curved shape.

6. The system of claim 1, wherein the sealing component comprises a cross-sectional shape that substantially matches a cross-sectional shape of an inner surface of the extended portion.

7. The system of claim 6, wherein the cross-sectional shape of the inner surface of the extended portion is different than a cross-sectional shape of an outer surface of the extended portion.

8. The system of claim 1, wherein the inner surface is a section of the extended portion closest to the sealing surface, and the outer surface is a section of the extended portion furthest from the sealing surface.

9. An aftertreatment system comprising:
   an aftertreatment component;
   a bellows comprising;
     an elongated portion;
     a flange extending from the elongated portion at a non-zero angle, the flange comprising a first portion and a second portion; and
     an extended portion extending between the first portion and the second portion,
   the extended portion having a sealing component; and
   a connector coupling the aftertreatment component to the flange, the connector comprising a sealing surface adjacent to the flange of the bellows,
   wherein the sealing component contacts the sealing surface so as to create a seal between the bellows and the aftertreatment component.

10. The aftertreatment system of claim 9, wherein the extended portion defines a gap sized to at least partially receive the sealing component.

11. The aftertreatment system of claim 9, wherein the first portion comprises a first cross-sectional shape, the second portion comprises a second cross-sectional shape, and the extended portion comprises a third cross-sectional shape, wherein the third cross-sectional shape is different than the first cross-sectional shape and the second cross-sectional shape.

12. The aftertreatment system of claim 11, wherein the first cross-sectional shape is different than the second cross-sectional shape.

13. The aftertreatment system of claim 9, wherein the flange extends from the elongated portion at an angle between eighty and one hundred degrees.

14. The aftertreatment system of claim 9, wherein the sealing component and the extended portion are of a unitary construction.

15. The aftertreatment system of claim 9, wherein the sealing component, the extended portion, the first portion, and the second portion are of a unitary construction.

16. A bellows configured to couple to an aftertreatment system of an engine system, the bellows comprising:
   an elongated portion;
   a flange extending from the elongated portion at a non-zero angle, the flange comprising a first portion and a second portion;
   an extended portion extending between the first portion and the second portion and defining a gap, the extended portion having an inner surface and an outer surface, the first portion having a first cross-sectional shape, the second portion having a second cross-sectional shape, and the inner surface having a third cross-sectional shape, the outer surface having a fourth cross-sectional shape, the third cross-sectional shape and the fourth cross-sectional shape being different than both the first cross-sectional shape and the second cross-sectional shape; and
   a sealing component disposed in the gap;
   wherein the flange is configured to couple with an aftertreatment component of the aftertreatment system via a connector comprising a sealing surface adjacent to the flange, and wherein the sealing component is configured to contact the sealing surface so as to create a seal between the bellows and the aftertreatment component.

17. The bellows of claim 16, wherein the sealing component and the extended portion are of a unitary construction.

18. The bellows of claim 16, wherein the sealing component, the extended portion, the first portion, and the second portion are of a unitary construction.

19. The bellows of claim 16, wherein the first cross-sectional shape is different than the second cross-sectional shape.

20. The bellows of claim 16, wherein the sealing component comprises a cross-sectional shape that substantially matches a cross-sectional shape of an inner surface of the extended portion.

21. The bellows of claim 16, wherein the flange extends from the elongated portion at an angle between eighty and one hundred degrees.

* * * * *